United States Patent
Liang et al.

(10) Patent No.: US 11,733,128 B1
(45) Date of Patent: Aug. 22, 2023

(54) TEST DEVICE AND METHOD FOR STUDYING INFLUENCE OF EXTERNAL LOAD ON SOIL ARCHING EFFECT OF SHIELD TUNNEL

(71) Applicant: Hangzhou City University, Hangzhou (CN)

(72) Inventors: Luju Liang, Hangzhou (CN); Zhi Ding, Hangzhou (CN); Gang Wei, Hangzhou (CN); Changjie Xu, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 0 days.

(21) Appl. No.: 18/110,081

(22) Filed: Feb. 15, 2023

Related U.S. Application Data

(63) Continuation of application No. PCT/CN2022/097311, filed on Jun. 7, 2022.

(30) Foreign Application Priority Data

Mar. 8, 2022 (CN) .......................... 202210230851.X

(51) Int. Cl.
*G01M 99/00* (2011.01)
(52) U.S. Cl.
CPC ................................. *G01M 99/007* (2013.01)

(58) Field of Classification Search
CPC ..................... G01M 99/007; G01N 2203/0246
See application file for complete search history.

(56) References Cited

U.S. PATENT DOCUMENTS

| 11,556,680 B1 * | 1/2023 | Yu .............................. E21D 9/08 |
| 2022/0228486 A1 * | 7/2022 | Ye ........................... E21D 9/003 |

FOREIGN PATENT DOCUMENTS

| CN | 108489745 | A | * | 9/2018 | |
| CN | 211783340 | U | * | 10/2020 | ............. G01B 11/24 |
| CN | 212008577 | U | * | 11/2020 | ............. G01B 11/16 |
| CN | 113586070 | A | * | 11/2021 | |
| CN | 215573810 | U | * | 1/2022 | |
| CN | 114137181 | A | * | 3/2022 | |

* cited by examiner

*Primary Examiner* — Natalie Huls
(74) *Attorney, Agent, or Firm* — WPAT, P.C

(57) ABSTRACT

A test device and method for studying influence of external load on soil arching effect of shield tunnel, including a test chamber, a tunnel model and a control module. The tunnel model, including segments which are meshed with each other and can move relatively, the tunnel model is installed in the middle of the test chamber, and all sides of the tunnel model is filled with a test soil, the control module, including a set of deceleration motors and a variable cross-section guide rod, the variable cross-section guide rod is inserted into the tunnel model, which can reduce the diameter of the tunnel model, resulting in ground loss and soil arching effect.

6 Claims, 3 Drawing Sheets

TEST DEVICE AND METHOD FOR STUDYING INFLUENCE OF EXTERNAL LOAD ON SOIL ARCHING EFFECT OF SHIELD TUNNEL

TECHNICAL FIELD

This invention relates to a test device and method for studying influence of external load on soil arching effect of shield tunnel, belonging to technical field of indoor model test.

BACKGROUND

With advancing construction and improvement of urban subway system, there are more and more subway construction sites adjacent to the existing subway lines, which inevitably bring many potential safety hazards to the existing subway tunnels. Among all the hazards, the external load has a particularly prominent impact on the safety of the lower subway tunnel, due to its burstiness and uncertainty. Changes of confining pressure around tunnel and loading state of tunnel segments is a direct cause of subway tunnel defects under the external load. In the process of shield tunneling, soil arching effect is formed in the soil due to ground loss. Under the action of soil arching effect, the load on the upper part of the tunnel is transferred to both sides, the vertical earth pressure on the upper part of the tunnel decreases, while the lateral horizontal earth pressure increases, and the tunnel segment is in a reasonable and stable loading state. However, the external load could destroy the soil arching effect in the soil, and break the original load balance state of the segment structure, leading to increased deformation of tunnel cross-section; the incurred deformation could cause defects, such as segment concrete cracking, bolt failure, joint opening, segment water seepage and other issues, threatening the operation safety of subway trains. Therefore, it is necessary to study the influence of external load on soil arching effect of tunnel by indoor model test. At present, the shield tunnel test technology can't consider the soil arching effect, while the existing indoor test technology can't simulate the real tunnel excavation condition, nor can it obtain the actual tunnel segment soil pressure distribution.

SUMMARY

In order to solve the problems described above, this invention provides a test device and method for studying influence of external load on soil arching effect of shield tunnel, belonging to technical field of indoor model test.

A test device for studying influence of external load on soil arching effect of shield tunnel, including a test chamber, a tunnel model and a control module.

The test chamber has a cuboid structure, and a front panel and a back panel of the test chamber are provided with middle openings respectively for placing the tunnel model; the tunnel model is arranged in a center of the test chamber, and the control module controls a diameter of the tunnel model to simulate a ground loss in a tunneling process of the shield tunnel, thus forming the soil arching effect in soil.

The tunnel model is formed by splicing multi-segment rings (also referred to as tunnel segments) that are engaged with each other in staggered joints, and an engagement mode of the multi-segment rings is described as follows: both ends of odd-numbered segment rings are provided with circular arc-shaped grooves, and both ends of even-numbered segment rings are provided with two rod-shaped bulges, and the two rod-shaped bulges are inserted into adjacent circular arc-shaped grooves of two odd-numbered segment rings and slide freely along a circular arc, thus driving the two adjacent multi-segment rings to have relative circumferential rotation for firm engagement; the multi-segment rings of the tunnel model have a same outer diameter, and an inner diameter increases linearly from a middle of the tunnel model to both ends.

The control module is two in number, the two control modules are respectively installed at the both ends of the tunnel model; the control module includes a variable cross-section guide rod and a deceleration motor; the variable cross-section guide rod is placed inside the tunnel model, a length of the variable cross-section guide rod is half of a length of the tunnel model, and a cross-section size of the variable cross-section guide rod is consistent with an inner surface size of the tunnel model; the deceleration motor is connected with the variable cross-section guide rod, and the deceleration motor is configured to change the diameter of the tunnel model by moving the variable cross-section guide rod; when the variable cross-section guide rod moves to the middle of the tunnel model, the diameter of the tunnel model increases; when the variable cross-section guide rod moves to the both ends of the tunnel model, the diameter of the tunnel model decreases.

Furthermore, the front panel of the test chamber is a transparent tempered glass plate; and other lateral panels, the back panel and a bottom panel of the test chamber are stainless steel plates.

Furthermore, a rubber sleeve is sleeved outside the tunnel model, and an inner diameter of the rubber sleeve is the same as a minimum outer diameter of the tunnel model.

Further, each segment ring of the multi-segment rings includes four independent small segments, and a membrane pressure sensor is attached to the outer surface of each small segment.

Furthermore, the tunnel model is connected with the middle openings of the front panel and the back panel of the test chamber by the rubber sleeve, and pore spaces between the tunnel model and the test chamber are sealed.

A test method of the test device for studying influence of external load on soil arching effect of shield tunnel is provided by the disclosure, including the following steps:

(1) test preparation: placing the test device, cleaning the test chamber, and lubricating an inner wall of the test chamber;

(2) filling a first layer of soil: pouring sandy soil for testing into the test chamber in layers, and tamping the first layer of soil to a maximum compactness, and a thickness of the first layer of soil is equal to a maximum diameter of the tunnel model;

(3) the tunnel model: splicing the multi-segment rings and sticking the membrane pressure sensor on an outer surface of each the independent segment to assemble the tunnel model, sleeving the assembled tunnel into a rubber sleeve, and inserting the variable cross-section guide rods of the two control modules into the tunnel model from both ends of the tunnel model, thus making the multi-segment rings drive the rubber sleeve to expand; wherein after the diameter of the tunnel model reaches a maximum value, the tunnel model is installed at the middle openings of the front panel and back panel of the test chamber, and the tunnel model is connected and sealed with the middle openings of the front panel and back panel of the test chamber by the rubber sleeve;

(4) filling a second layer of soil: mixing sandy soil with rubber particles at the same level in different proportions to prepare the test soil with different compression properties, and filling the test soil to a top elevation of the tunnel model by using a sand pouring method;

(5) filling a third layer of soil: filling sandy soil to a surface elevation of a rest design by using the sand pouring method;

(6) simulation of shield tunneling: the two variable cross-section guide rods are controlled by the decelerating motor to move along the tunnel axis to both ends of the tunnel model to reduce the diameter of the tunnel model, simulating the ground loss caused by shield tunneling, and forming the soil arching effect; using a digital camera to automatically observe and record changes of soil displacement, and using the membrane pressure sensor to record changes of soil pressure; and (7) applying external load: laying a steel plate on the surface of the test soil, and stacking mass blocks with different weights on the steel plate; using the digital camera to automatically observe and record changes of soil displacement, and using the membrane pressure sensor to record changes of soil pressure.

The beneficial effects of this invention are described as follows: this invention realizes the simulation of the soil pressure distribution of multi segment rings shield tunnel under an action of external load, moreover, considering the soil arching effect generated during shield tunneling, it can change the tunnel diameter by controlling the movement of segments, in order to study external load on soil arching effect of shield tunnel, thus making up the defects of the existing indoor test methods of shield tunnel.

DESCRIPTION OF REFERENCE NUMERALS IN THE DRAWINGS

1—test chamber, 2—transparent glass plate, 3—tunnel model, 4—control module, 5—steel plate, 6—mass block, 31—multi-segment ring, 32—rubber sleeve, 41—deceleration motor, 42—variable cross-section guide rod.

DETAILED DESCRIPTION OF EMBODIMENTS

In order to make the object, technical scheme and advantages of the present invention clearer, the embodiments of the present invention will be described in detail below with reference to the attached drawings.

Figure 1:
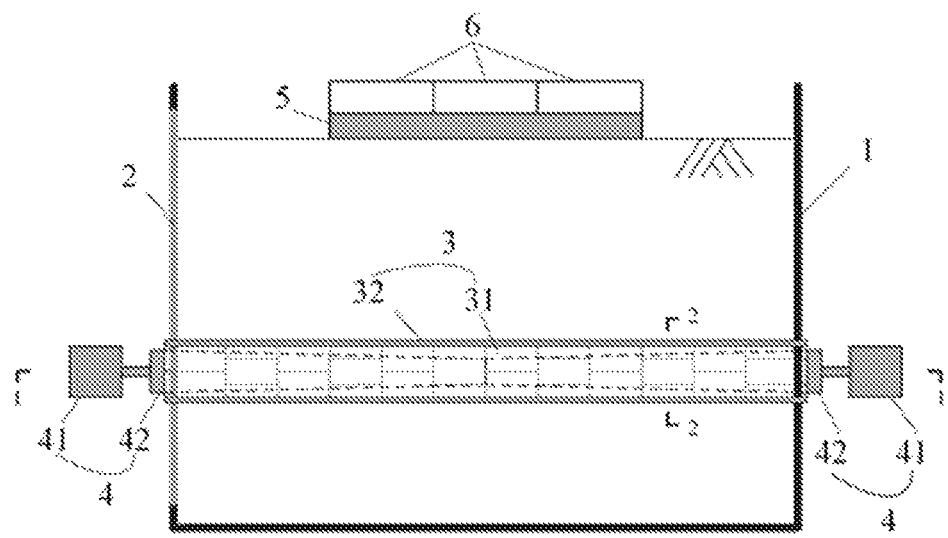
FIG. 1 illustrates a schematic view of the test device of the present invention.

As shown in FIG. 1, this embodiment provides a test device for studying the influence of external load on soil arching effect of shield tunnel, including a test chamber 1, a tunnel model 3, and a control module 4. The tunnel model 3 is arranged in the center of the test chamber 1 and connected with the control module 4. The control module 4 controls the change of the diameter of the tunnel model 3 to simulate the ground loss in the process of shield tunneling, thus forming the soil arching effect in the soil.

As shown in FIG. 1, the test chamber 1 has a cuboid structure, the front panel of the test chamber 1 is a transparent tempered glass plate 2, and the other lateral panels, back panel and bottom panel are stainless steel plates; the transparent glass plate 2 and the opening in the middle of the back panel of the test chamber 1 are used for arranging the tunnel model 3.

Figure 2:
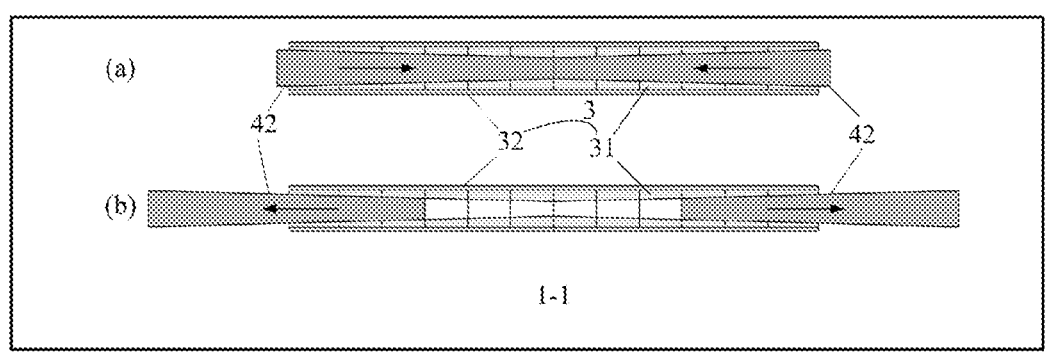
FIG. 2 illustrates a schematic view of the longitudinal section (1-1) of the tunnel model and control module of the present invention.
Figure 3:
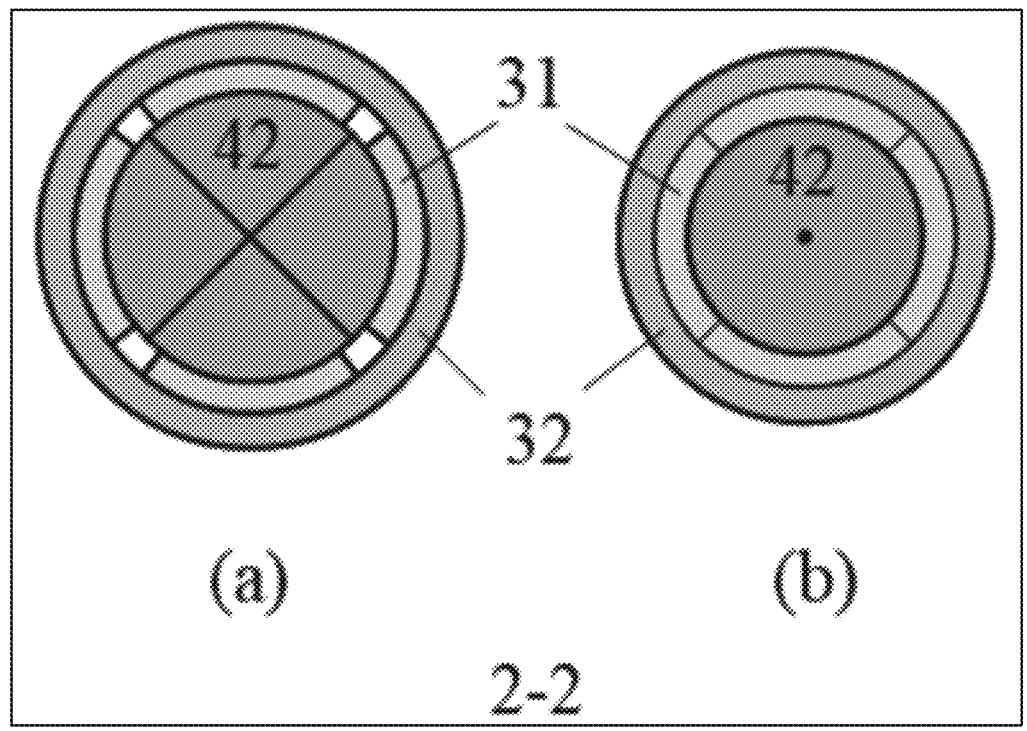
FIG. 3 illustrates a schematic view of the cross section (2-2) of the tunnel model and the control module of the present invention.

As shown in FIG. 2 and FIG. 3, the tunnel model 3 is formed by splicing multi-segment rings 31 that are engaged with each other in staggered joints, each multi-segment ring 31 includes four independent small segments, and a membrane pressure sensor is attached to the outer surface of each of the small segment to test the change of the soil pressure of the small segments during the experiment. Each multi-segment ring 31 of the tunnel model 3 have the same outer diameter, and the inner diameter of the multi-segment ring 31 increases linearly from the middle of the tunnel model to both ends of tunnel model; a rubber sleeve 32 is sleeved outside the tunnel model 3, and the inner diameter of the rubber sleeve 32 is the same as the minimum outer diameter of the tunnel model 3 in the natural state; the both ends of the tunnel model 3 are arranged at the openings (also referred to as middle openings) of the transparent tempered glass plate 2 and the back panel of the test chamber 1, and are connected with the test chamber 1 by rubber sleeves 32 to seal the pore spaces between the tunnel model 3 and the test chamber 1.

Figure 4:
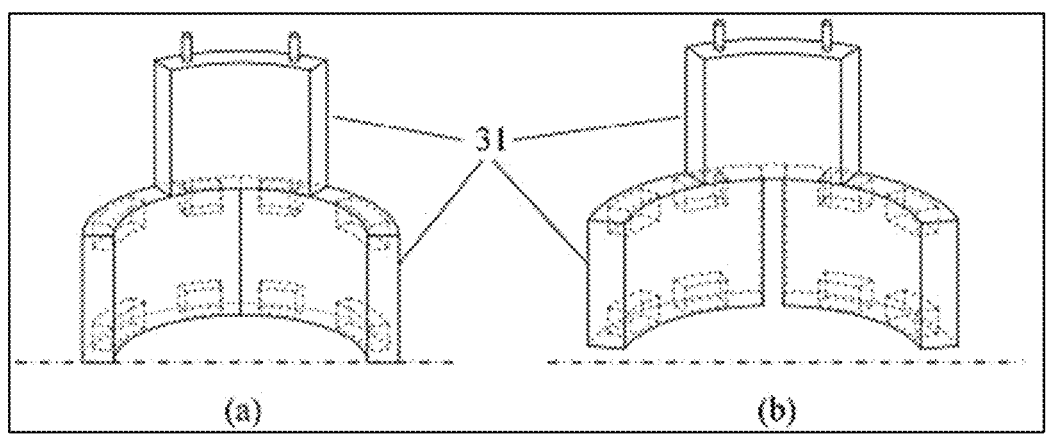
FIG. 4 illustrates a schematic view of splicing state of tunnel model segments of the present invention.

As shown in FIG. 4, the multi-segment rings 31 are divided into odd segment rings and even segment rings, which have different shapes; both ends of odd-numbered segment rings are provided with arc-shaped grooves, and both ends of even-numbered segment rings are provided with two rod-shaped bulges. In the assembling process, the two rod-shaped bulges of the even-numbered segment rings are inserted into the circular arc grooves adjacent to the two odd-numbered segment rings, and the even-numbered segment rings and the odd-numbered segment rings can rotate relatively to each other in the circular arc direction through this connection mode.

As shown in FIG. 2, FIG. 3 and FIG. 4, the control module 4 is two in number, the two control modules 4 are respectively installed at the both ends of the tunnel model 3, each control module 4 includes a variable cross-section guide rods 42 and a deceleration motor 41; the variable cross-section guide rod 42 is placed inside the tunnel model 3, and a length of the variable cross-section guide rod 42 is half of a length of the tunnel model 3. The shape of cross-section of the variable cross-section guide rod 42 is circular, and the change of the size of the variable cross-section guide rod 42 is consistent with that of inner surface of the tunnel model 3. The deceleration motor 41 is connected with the variable cross-section guide rod 42, and the variable cross-section guide rod 42 can be controlled to move along the tunnel axis, thereby changing the diameter of the tunnel model 3, and specific steps of controlling the variable cross-section guide rod 42 to move are as follows:

1) When the deceleration motor 41 controls the variable cross-section guide rod 42 to move to the middle of the tunnel model 3 along the tunnel axis, the state of section 1-1 changes from (b) to (a) as shown in FIG. 2. Under the push of the variable cross-section guide rod 42, the multi-segment ring 31 drives the rubber sleeve 32 to move outward along the radial direction of the tunnel model 3 through the rotation between the multi-segment rings 31. The state of section 2-2 changes from (b) to (a) as shown in FIG. 3, and the splicing state between segments changes from (a) to (b) as shown in FIG. 4, thus increasing the diameter of the tunnel model 3.

2) When the deceleration motor 41 controls the variable cross-section guide rod 42 to move to both sides of the tunnel model 3 along the tunnel axis, the state of section 1-1 changes from (a) to (b) in FIG. 2. Under the external soil load and the extrusion of rubber sleeve 32, multi-segment rings 31 move radially inward along the tunnel model 3, and the state of section 2-2 changes from (a) to (b) in FIG. 3, the splicing state of the segments is changed from (b) to (a) in FIG. 4, thus decreasing the diameter of the tunnel model 3.

Figure 5:
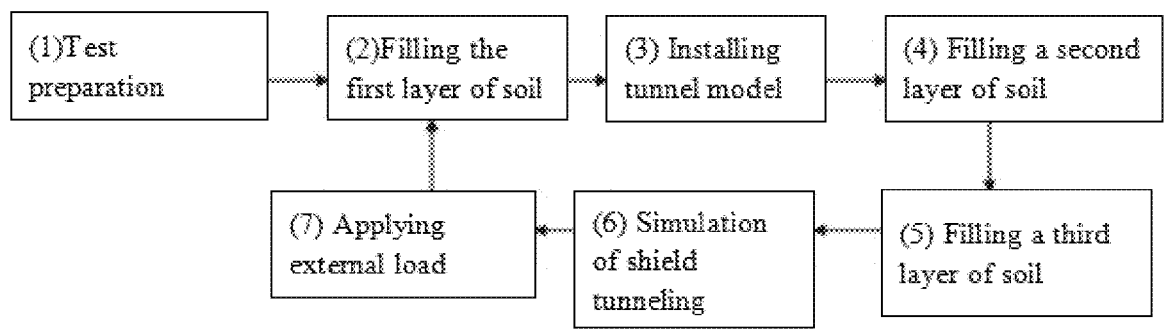
FIG. 5 illustrates a flow chart of the test method of the present invention.

A test method of the test device for studying influence of external load on soil arching effect of shield tunnel as shown in FIG. 5, including the following steps:

(1) Test preparation: the test device was put in place and the test chamber 1 was cleaned, and an inner wall of the test chamber 1 was lubricated: the inner wall of transparent tempered glass plate 2 was lubricated with vaseline emulsion or transparent silicone oil, and Teflon film was stuck on the inner walls of other steel plates;

(2) filling the first layer of soil: the sandy soil for testing was poured into the test chamber 1 in layers and tamped to the maximum compactness, so that the tunnel model 3 has an underlying bearing layer with high rigidity, and the thickness of the bearing layer is 0.5 m, which is the same as the maximum diameter of the tunnel model 3;

(3) installing the tunnel model 3: the multi-segment rings 31 were spliced and a membrane pressure sensor was attached to the outer surface of each small segment to assemble the tunnel model 3, the assembled tunnel model 3 was sleeved into the rubber sleeve 32, and the variable cross-section guide rods 42 of the two sets of control modules 4 were inserted into the tunnel model 3 from both ends, in order for the multi-segment rings 31 to drive the rubber sleeve 32 to expand. After the two variable cross-section guide rods 42 were inserted into the middle of the tunnel model 3, the diameter of the tunnel model 3 reaches the maximum. The tunnel model 3 was installed in the reserved position of the test chamber 1, the reserved position of the test chamber refers to the position of openings of the transparent tempered glass plate 2 and the back panel of the test chamber 1, and the tunnel model 3 was connected with the test chamber through a rubber sleeve 32 to seal the pore spaces between the tunnel model 3 and the test chamber 1;

(4) filling the second layer of soil: sandy soil and rubber particles were mixed at the same level in a ratio of 1:1 to prepare test soil, the test soil was filled to the top elevation of the tunnel model 3 by layers according to the falling distance of 50 cm by using sand pouring method;

(5) filling the third layer of soil: the sandy soil was filled to the designed surface elevation of the test by using sand pouring method according to the falling distance of 50 cm;

(6) simulation of shield tunneling: the two variable cross-section guide rods 42 are controlled to move along the tunnel axis to both ends by the decelerating motor 41, so that the diameter of the tunnel model 3 was reduced, therefore, the ground loss caused by shield tunneling was simulated, and the soil arching effect was formed;

(7) applying external load: a steel plate 5 was arranged on the surface of the soil sample, and mass blocks 6 with different weights are stacked on the steel plate 5;

In the process of shield tunneling simulation and external load application, the change of soil displacement was automatically observed and recorded by digital camera, and the change of soil pressure was recorded by membrane pressure sensor. After the test, the soil in the test chamber 1 was emptied and moved out of the tunnel model 3, then, the test parameters are changed, and repeated step (2) to start the next set of tests.

By changing the filling height, steel plate position, steel plate size and weight of the mass block 6, this invention can study the influence of complex external load conditions, including different tunnel burial depth, different external load acting position, acting range and acting size, on the soil arching effect and the changes of earth pressure of shield tunnel.

By changing the ratio of different sandy soil and rubber particles in step (4), this invention can study the influence of external load on the soil arching effect of shield tunnel under different stratum hardness. The above comprehensive technical means and research methods can provide reference for practical projects.

What is claimed is:

1. A test device for studying influence of external load on soil arching effect of a shield tunnel, comprising a test chamber, a tunnel model and a control module;

wherein the test chamber has a cuboid structure, and a front panel and a back panel of the test chamber are provided with middle openings respectively for placing the tunnel model; the tunnel model is arranged in a center of the test chamber, and the control module controls a diameter of the tunnel model to simulate a ground loss in a tunneling process of the shield tunnel, thus forming the soil arching effect in soil;

wherein the tunnel model is formed by splicing multi-segment rings that are engaged with each other in staggered joints, and an engagement mode of the multi-segment rings is described as follows: both ends of odd-numbered segment rings are provided with circular arc-shaped grooves, and both ends of even-numbered segment rings are provided with two rod-shaped bulges, and the two rod-shaped bulges are inserted into adjacent circular arc-shaped grooves of two odd-numbered segment rings and slide freely along a circular arc, thus driving the two adjacent multi-segment rings to have relative circumferential rotation for firm engagement; each of the multi-segment rings of the tunnel model have a same outer diameter, and an inner diameter of the multi-segment ring increases linearly from a middle of the tunnel model to both ends of the tunnel model; and wherein the control module is two in number, the two control modules are respectively installed at the both ends of the tunnel model; the control module comprises a variable cross-section guide rod and a deceleration motor; the variable cross-section guide rod is placed inside the tunnel model, a length of the variable cross-section guide rod is half of a length of the tunnel model, and a cross-section size of the variable cross-section guide rod is consistent with an inner surface size of the tunnel model; the deceleration motor is connected with the variable cross-section guide rod, and the deceleration motor is configured to change the diameter of the tunnel model by moving the variable cross-section guide rod; when the variable cross-section guide rod moves to the middle of the tunnel model, the diameter of the tunnel model increases; when the variable cross-section guide rod moves to the both ends of the tunnel model, the diameter of the tunnel model decreases.

2. The test device for studying influence of external load on soil arching effect of the shield tunnel as claimed in claim 1, wherein the front panel of the test chamber is a transparent tempered glass plate; and other lateral panels, the back panel and a bottom panel of the test chamber are stainless steel plates.

3. The test device for studying influence of external load on soil arching effect of shield tunnel as claimed in claim 1, wherein a rubber sleeve is sleeved outside the tunnel model, and an inner diameter of the rubber sleeve is the same as a minimum outer diameter of the tunnel model.

4. The test device for studying influence of external load on soil arching effect of shield tunnel as claimed in claim 1, wherein each segment ring of the multi-segment rings comprises four independent segments, and a membrane pressure sensor is attached to an outer surface of each of the four independent segments.

5. The test device for studying influence of external load on soil arching effect of shield tunnel as claimed in claim 3, wherein the tunnel model is connected with middle openings of the front panel and the back panel of the test chamber by the rubber sleeve, and pore spaces between the tunnel model and the test chamber are sealed.

6. A test method of the test device for studying influence of external load on soil arching effect of the shield tunnel as claimed in claim 4, comprising following steps:
   (1) test preparation: placing the test device, cleaning the test chamber, and lubricating an inner wall of the test chamber;
   (2) filling a first layer of soil: pouring sandy soil for testing into the test chamber in layers, and tamping the first layer of soil to a maximum compactness, and a thickness of the first layer of soil is equal to a maximum diameter of the tunnel model;
   (3) installing the tunnel model: splicing the multi-segment rings and sticking the membrane pressure sensor on an outer surface of each the independent segment to assemble the tunnel model, sleeving the assembled tunnel into a rubber sleeve, and inserting the variable cross-section guide rods of the two control modules into the tunnel model from both ends of the tunnel model, thus making the multi-segment rings drive the rubber sleeve to expand; wherein after the diameter of the tunnel model reaches a maximum value, the tunnel model is installed at the middle openings of the front panel and back panel of the test chamber, and the tunnel model is connected and sealed with the middle openings of the front panel and back panel of the test chamber by the rubber sleeve;
   (4) filling a second layer of soil: mixing the sandy soil with rubber particles at a same level in different proportions to prepare test soil with different compression properties, and filling the test soil to a top elevation of the tunnel model by using a sand pouring method;
   (5) filling a third layer of soil: filling the sandy soil to a surface elevation of a rest design by using the sand pouring method;
   (6) simulation of shield tunneling: the two variable cross-section guide rods are controlled by the decelerating motor to move along a tunnel axis to both ends of the tunnel model to reduce the diameter of the tunnel model, simulating the ground loss caused by in the tunneling process of the shield tunnel, and forming the soil arching effect; using a digital camera to automatically observe and record changes of soil displacement, and using the membrane pressure sensor to record changes of soil pressure; and
   (7) applying external load: laying a steel plate on a surface of the test soil, and stacking mass blocks with different weights on the steel plate; using the digital camera to automatically observe and record changes of the soil displacement, and using the membrane pressure sensor to record changes of the soil pressure.

\* \* \* \* \*